United States Patent [19]

Nishimura

[11] Patent Number: 5,501,301

[45] Date of Patent: Mar. 26, 1996

[54] BICYCLE BRAKE ARM HAVING A BRAKE SHOE CLEARANCE ADJUSTING MECHANISM

[75] Inventor: Yasushi Nishimura, Izumi, Japan

[73] Assignee: Shimano Inc., Osaka, Japan

[21] Appl. No.: 277,269

[22] Filed: Jul. 21, 1994

[30] Foreign Application Priority Data

Jul. 26, 1993 [JP] Japan .................................. 5-040631

[51] Int. Cl.$^6$ ............................... B62L 1/08; B62L 1/14
[52] U.S. Cl. ..................... 188/24.19; 188/24.12
[58] Field of Search .............................. 188/24.12, 24.13, 188/24.14, 24.19, 24.21, 73.1, 250 B, 250 G, 264 A

[56] References Cited

U.S. PATENT DOCUMENTS

| | | | |
|---|---|---|---|
| 4,051,924 | 10/1977 | Yoshigai | 188/24.12 |
| 4,441,592 | 4/1984 | Everett | 188/24.12 |
| 4,611,692 | 9/1986 | Everett | 188/250 B |
| 4,768,623 | 9/1988 | Nagano | 188/24.21 |
| 5,293,965 | 3/1994 | Nagano | 188/2 D |
| 5,320,199 | 6/1994 | Min | 188/24.19 |

Primary Examiner—Robert J. Oberleitner
Assistant Examiner—Chris Schwartz
Attorney, Agent, or Firm—Shinjyu Office of Patent Attorney

[57] ABSTRACT

The present invention relates to a bicycle brake arm 1 used in a brake caliper apparatus. The brake arm 1 mounted to a bicycle frame F for pivotal movement about an axis X. A brake shoe mounting bracket 4 is likewise coupled to the bicycle frame F for pivotal movement about the axis X. In one embodiment, the brake arm 1 is formed with an arcuate recess 12 whose arcuate center coincides with the axis X. The brake shoe mounting bracket 4 has a first portion 4a formed with an arcuate contour, conforming to the contour of the recess 12, and the first portion 4a is slidably disposed within the recess 12. A bolt 9 extends through an elongated arcuate screw hole 8 formed in the first portion 4a and an aperture 4g formed in the brake arm 1. A brake shoe 5 is mounted to a position adjusting mechanism formed on the second portion 4b of the bracket 4. Loosening of the bolt 9 allows for easy adjustment of the clearance between the brake shoe 5 and a bicycle tire rim 6 independent of position adjustments of the shoe via the position adjusting mechanism formed on the second portion 4b of the bracket 4.

15 Claims, 3 Drawing Sheets

BICYCLE BRAKE ARM HAVING A BRAKE SHOE CLEARANCE ADJUSTING MECHANISM

BACKGROUND OF THE INVENTION

The present invention relates to a bicycle brake caliper device employing two brake arms, each arm having a brake shoe clearance adjusting mechanism and a brake shoe position adjusting mechanism. More specifically, each brake arm includes means for independently adjusting the clearance of the shoe with respect to the rim of the adjacent bicycle tire and at least one angle of the shoe with respect to the rim, independent of one another.

DESCRIPTION OF THE RELATED ART

Conventional bicycle brake mechanisms typically include two opposing caliper brake arms, one on each side of a bicycle tire rim, each arm having a brake shoe attached thereto for engagement with the bicycle tire rim. Movement of the brake arms is effected by a cable which extends between a lever on the handlebar of the bicycle and the brake arms. The cable length and the clearance between the tire rim and brake shoes are usually adjusted upon installation for proper brake function. However, as the bicycle is used, the shoes tend to wear causing the clearance between the shoes and the rim to increase, leaving the brake system in a less than optimal operational state.

Re-adjustment of the shoe clearance has recently become an important maintenance procedure as bicycles and bicyclists have become more sophisticated. Formerly, the re-adjustment of shoe clearance was a tedious process involving various cable adjustments or the like. Recently, special shoe mounting configurations have been devised to assist in the adjustment of shoe clearance. In one such configuration, disclosed in Japanese Utility Model Publication No. Sho 63-16633, the brake shoes are fastened with mounting screws to the brake arms so that the brake shoe has a variety of degrees of movement which allow for accurate placement of the shoe with respect to the tire rim. In such a configuration, the brake arm is provided with an elongated slot that extends along its length perpendicular to the axis about which the brake arm pivots. The brake arm is further provided with curved surfaces adjacent to the length of the slot such that one side of the brake arm has a concave curvature adjacent to the slot while the second side of the arm has a convex curvature adjacent to the slot. A bolt extends through the slot. One end of the bolt has an aperture extending through it perpendicular to the length of the bolt. The bolt further extends through washers, one washer on each side of the brake arm, one washer convex to conform to the concave side of the arm and one washer concave to conform the convex side of the brake arm. A nut on the second end of the bolt tightens the bolt within the slot such that the washers lock the bolt in position within the slot in the brake arm.

The brake shoe is formed with a shaft which extends from one side of the shoe. The shaft is inserted in the aperture in the end of the bolt. Tightening of the bolt within the slot of the arm also locks the shaft of the shoe into position with respect to the bolt and arm as the shaft is brought into engagement with one of the washers. This configuration on allows for movement of the brake shoe by moving the bolt up and down in the slot, pivoting to the bolt with respect to the curvature of the surfaces adjacent to the slot, extending the shaft within the aperture or rotating the shaft and rotation of the bolt itself. In other words, the shoe can be adjusted: 1) up and down due to the length of the slot; 2) pivoted about an axis defined by the curvature of the concave and convex surfaces adjacent to the slot; 3) pivoted about the axis defined by the bolt; 4) the shoe can be rotated about its attached shaft (which extends into the aperture of the bolt) and 5) the shoe shaft can be extended in and out with respect to the aperture of the bolt. Hence, the shoe has five degrees of freedom when the bolt is loosened. A serious deficiency in the above described configuration, is that all degrees of adjustment are released when the nut on the bolt is loosened. As a consequence, a clearance adjustment is not a simple procedure. Each of the five possible degrees of freedom must be taken into account, as all five degrees of freedom are effected upon loosening of the bolt. A very careful placement of the shoe is necessary taking all five degrees of freedom or dimensions into account, when only one dimensional adjustment may be required.

SUMMARY OF THE INVENTION

An object of the invention is to provide a bicycle brake apparatus with means to independently adjust the clearance between a brake shoe and a bicycle tire rim and the angular orientation of the brake shoe with respect to the tire rim.

In one aspect of the present invention, a bicycle brake mechanism is provided with a brake arm which is mounted to the frame of a bicycle for pivotal movement about a pivot axis defined on the bicycle frame adjacent to a bicycle tire rim a first embodiment of the present invention, the brake arm is formed with an arcuate recess having a center which coincides with the pivot axis. An aperture is formed within the recess. A brake shoe bracket is formed with an arcuate portion which conforms to the arcuate recess and is disposed therein. The arcuate portion is formed with an elongated arcuate screw hole. A bolt extends through the aperture and the elongated screw hole.

A brake shoe mounting mechanism is mounted to a portion of the brake shoe bracket and a brake shoe is attached to the mounting mechanism. The mounting mechanism includes: two spherical surfaces formed on opposite sides of a portion of the brake shoe bracket an aperture which extends therethrough; the brake shoe formed with a friction pad on a first side thereof, a mounting screw extending from a second side thereof, and a concave spherical recess formed concentrically with the mounting screw, the screw extending through the aperture in the bracket such that the concave spherical recess engages one of the spherical surfaces; and a mounting washer having one surface provided with a convex spherically shaped surface, an aperture extending therethrough, where the screw extends through the aperture such that the second spherical surface engages the concave surface of the washer.

The brake shoe bracket is mounted on the brake arm such that the clearance between the brake shoe and the rim of an adjacent bicycle tire may be adjusted by loosening the bolt which extends through the aperture in the arm and the elongated screw hole. With the bolt loosened, the bracket may slide about an arcuate path defined by the recess formed in the brake arm, thus bringing the brake shoe closer to or further from the tire rim. The angular position of the shoe with respect to the tire rim is generally not effected by such an adjustment. Rather the angular orientation of the brake shoe with respect to the tire rim is determined by an adjustment of the brake shoe mounting mechanism provided on the brake shoe bracket. By loosening a nut on the screw, the angular orientation of the brake shoe with respect to the tire rim may be altered by changing the position of the screw in the aperture which extends through the two spherical surfaces formed on opposite sides of a portion of the brake shoe bracket. These two adjustments are generally independent of one another.

The adjustment of shoe clearance without change in mount posture or angular orientation of the brake shoes may be effected by use of the present invention. In re-adjustment of the shoe clearance, no other adjustments should be required. The adjustment process may readily be attained in a rapid manner. Also, installation of a brake mechanism utilizing the present invention may be easily and rapidly carried out since the shoe clearance adjustment and angular position adjustments are independent of one another.

DETAILED DESCRIPTION OF THE INVENTION

Figure 1:
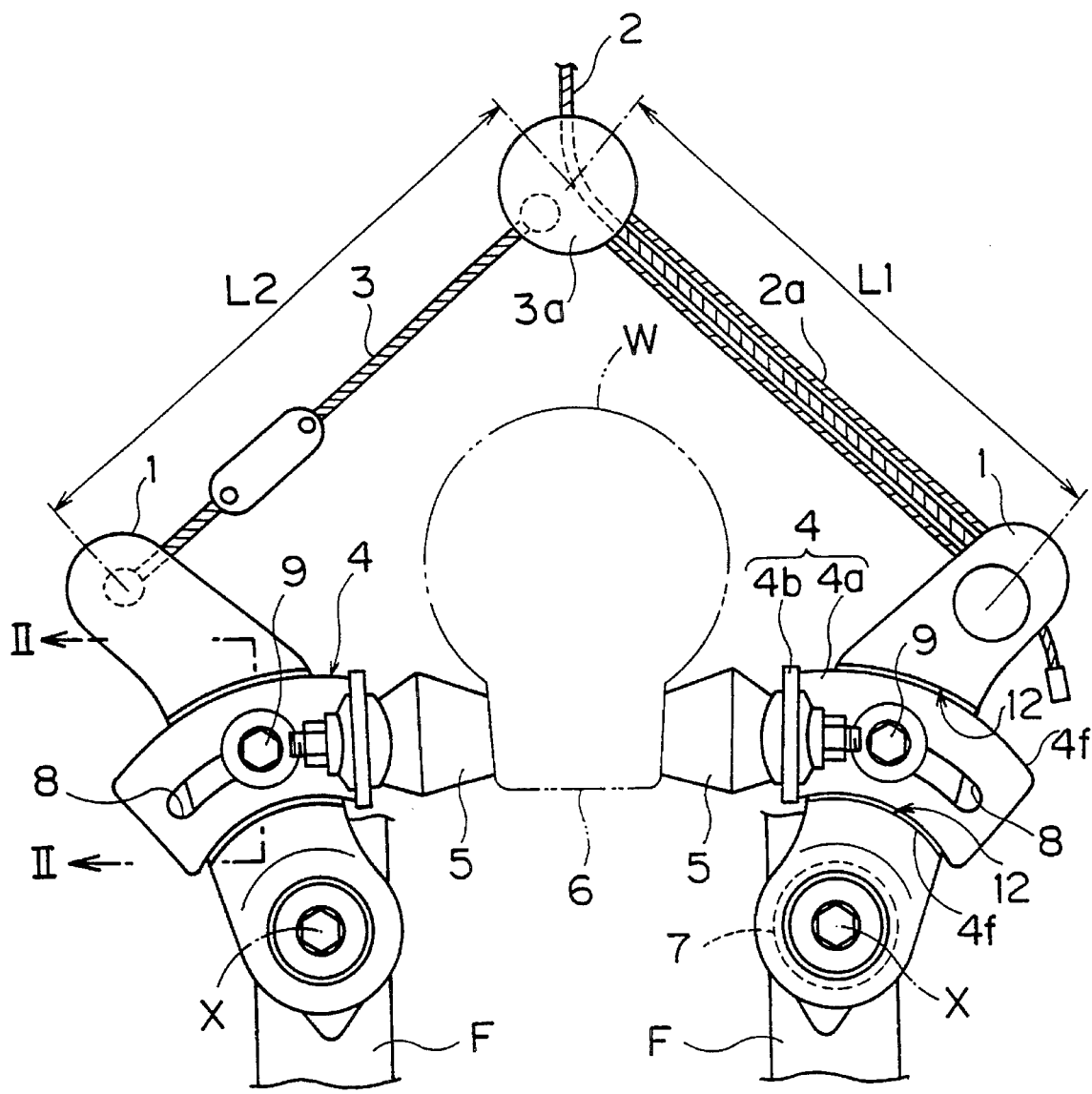
FIG. 1 is a front elevation, partial section view showing caliper type brake mechanism having two brake arms, each arm provided with a brake shoe clearance adjusting mechanism and a brake shoe angular orientation adjusting mechanism according to the present invention.

With reference to FIG. 1, wherein like elements are identified with like reference numerals throughout the figures, the structure of a cantilever type brake apparatus for a bicycle is shown. One of the brake arms 1 is mounted on a bicycle body frame F. Only a portion of the bicycle frame F is shown. The portion of the frame F depicted is a portion the bicycle frame which extends along each side of a bicycle wheel W. Each brake arm 1 is pivotally supported by a shaft X, each shaft X typically welded to the frame F. Each brake arm 1 pivots about the shaft X. Hereinafter, the shafts X will be referred to as axis X, since each shaft defines an axis about which each respective brake arm pivots.

A free end of one of the brake arms 1 is connected to a brake wire 2 and a free end of the other of the brake arms 1 is connected to the brake wire 2 through a connector 3 as is explained in greater detail below.

The two brake arms 1 are generally identical with one another, except that each has a general configuration symmetrical to the other (they are mirror images of each other). Therefore, description of one arm 1 is generally applicable to the other. Hence forth description will refer to only one arm, but is deemed to be directed to both arms.

Figure 2:
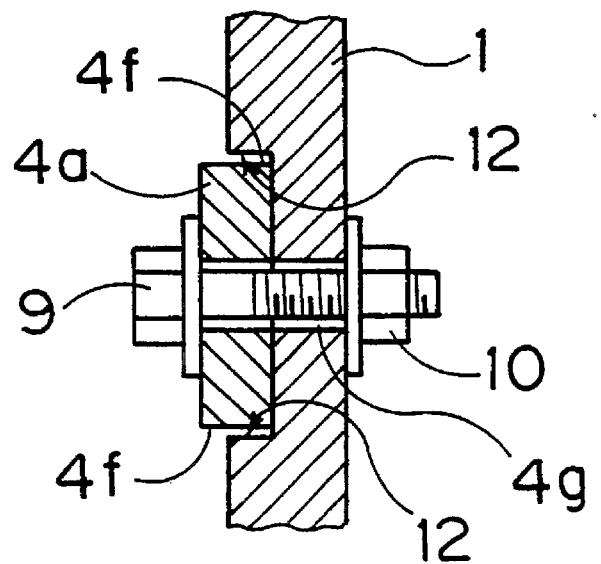
FIG. 2 is a fragmentary section taken along the line II—II in FIG. 1, showing a portion of the brake shoe clearance adjusting mechanism.

The arm 1 is formed in a mid-portion with an arcuate recess 12, the arcuate contour having a center point which coincides with the axis X about which the arm 1 rotates. Within the arcuate recess 12 is an arcuate support member 4. The support member 4 includes two generally perpendicular portions, an arcuate portion member 4a having an elongated screw slot 8 formed therein, and a shoe mount portion 4b which extends toward the viewer in FIG. 1, generally perpendicular to the arcuate portion 4a. As shown in FIGS. 1 and 2, the portion 4a is fastened and fixed to the brake arm 1 by a mount screw 9 which extends through a hole 4g formed in the arm 1. The screw 9 also extends through the screw hole 8 and is tightened by an associated nut 10.

Figure 3:
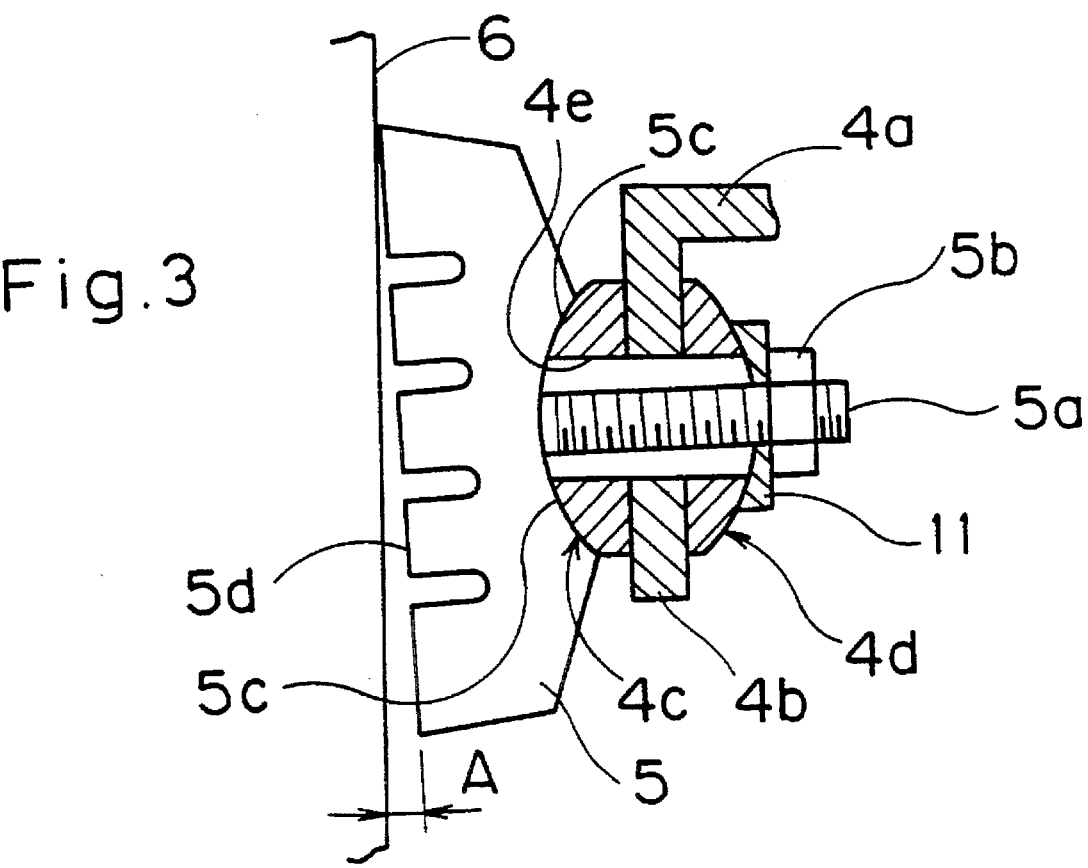
FIG. 3 is a fragmentary partial cross-section top view of a portion of the device depicted in FIG. 1, showing the brake shoe angular orientation adjusting mechanism.

As shown in FIGS. 1 and 3, the portion 4b is formed with an aperture 4e. Formed on either surface of the portion 4b encircling the aperture 4e, are two convex receiving surfaces 4c and 4d. A brake shoe 5 is formed with a concave spherical shaped surface 5c and a screw 5a which extends outwardly from the concave surface 5c, on the back side of the brake shoe 5, opposite a tire rim engaging surface 5d. The aperture 4e is comparatively large with respect to the diameter of the screw 5a, as will be explained below. The screw 5a extends through the oversized aperture 4e and is fastened to the portion 4b via a nut 5b. As shown in FIG. 3, the receiving surface 4c is formed so that the surface 5c engages it. As a result, the portion 4b is receives and retains in the brake shoe 5. A spacer seat member 11 is provided with a concave surface that likewise engages the receiving surface 4d.

The surfaces 4c and 5c, the surfaces 4d and the seat member 11, and the oversized hole 4e allow for the brake shoe 5 to rotate and pivot freely with respect to the aperture 4e when the nut 5b is loosened. The surfaces formed on the member 4b, the shoe surface 5c and the member 11 therefore provide the arm 1 with a brake shoe orientation adjustment mechanism for adjusting the mount posture of the brake shoe 5 relative to the support member 4 and the tire rim 6. Specifically, the brake shoe positional mechanism allows for adjustment of, for instance, the toe-in angle A depicted in FIG. 3.

The brake mechanism depicted in FIGS. 1–3 generally operates as follows. The movement of the brake wire 2 causes engagement and disengagement of the brake arms. More specifically, when the brake wire 2 is operatively drawn, the operation force causes the right and left brake arms 1 to swing upwardly. The brake shoe 5 mounted to an intermediate portion of each brake arm 1 through a support member 4 is brought into pressing contact with a side surface of a wheel rim 6 for providing the frictional brake action for brake operation. Then, when the brake wire is loosened, each of the right and left brake arms 1 is swung downward by a biasing action of a return spring 7 provided at the proximal end portion of each brake arms. As a result, each brake shoe 5 is separated away from the side surface of the wheel rim 6 to release the brake action for brake-off condition.

The brake wire 2 is rotatably inserted into a tubular member 2a shown in FIG. 1. In the engaged position of the brake, due to the tension action of the brake wire 2, one end of the tubular member 2 is brought into contact with the brake arm 1 and the other end thereof is brought into contact with the connector 3 and the connector member 3a of the brake wire 2. The tubular member 2a serves provides a tension action so as to provide a predetermined length L1 between the brake arm 1 and the connector member 3a. The brake wire 2 is slidably inserted into the connector member 3a. When the brake operation is effected, due to the tension action of the tubular member 2a, the distance L1 between one brake arm 1 and the connector member 3a is equal to a distance L2 between the other brake arm 1 and the connector member 3a. Accordingly, both right and left brake shoes 5 serve to brake the wheel rim 6 simultaneously and at an equal pressure.

The portion 4a of the support member 4 is slidably mounted into the groove or recess 12 of the brake arm 1. The arcuate shape of the recess 12 has a center about the axis X, as shown in FIG. 1. When the bolt nut 10 is loosened, the support member 4 may slide in an arcuate path within the recess 12 bringing the shoe 5 either closer to or away from the rim 6. Thus, the support member 4 is released from the fastening action of the mount screw 9 and may undergo an adjustment of the clearance between the rim 6 and the shoe 5. After use of the bicycle, the brake shoes 5 will typically wear, thus increasing the clearance distance between the rim 6 and the shoe 5. An increased distance decreases the effectiveness and response of the brakes. Therefore, loosening of the bolt 10 provides a means of adjusting the clearance without altering the angular position of the shoe 5 relative to the rim 6. The arcuate contour of the recess 12 limits the movement of the portion 4a, of the support member 4 to a path that coincides with the movement of the brake shoe 5 during normal operation. That is, the shoe 5, during adjustment, moves about an arcuate path that coincides with the movement of the shoe during engagement and disengagement operations since both the arm 1 and the support member 4 follow an arcuate path whose center is the axis X. Thus, due to the dual adjusting mechanisms of the present invention, it is possible to independently adjust the clearance between a brake shoe 5 and a tire rim 6 and adjust the angular orientation of the brake shoe 1 with respect to the tire rim 6 without one adjustment significantly effecting the other.

Figure 4:
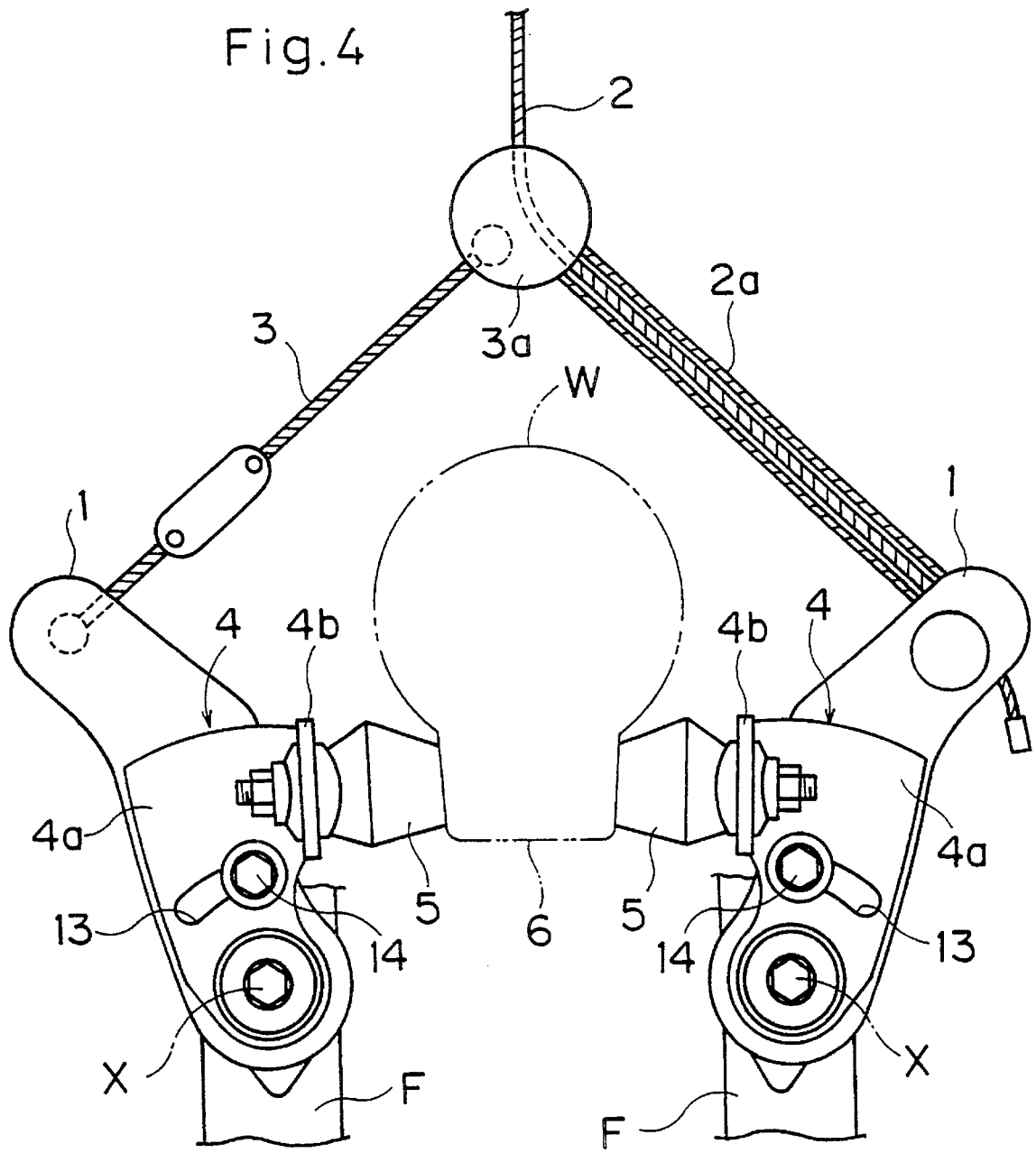
FIG. 4 is a front elevation, partial section view, similar to FIG. 1, showing an alternate embodiment of the present invention.

In FIG. 4, an alternate embodiment of the present invention is shown. In FIG. 4, a brake apparatus is depicted where a support member 4 mounted to each brake shoe 5 is adjustably mounted on the brake arm 1. The brake arms 1, unlike the above described embodiment are not formed with recesses 12, but rather have a generally flat face with an aperture (not shown) formed therein near but spaced apart from the pivot point X. The support member 4 is formed with two portions, a partially arcuate portion 4a and a shoe mounting portion 4b. The portion 4b is generally the same as the previously described corresponding member in the embodiment described with reference to FIGS. 1–3. The portion 4a is similar to the corresponding portion described with reference to FIGS. 1–3 but extends downward, in FIG. 4, and is formed with a bore (not shown) through which the shaft X extends. The portion 4a, in FIG. 4 pivots about the shaft or axis X.

In the embodiment depicted in FIG. 4, the portion 4a is further formed with an elongated screw hole 13. A bolt 14 extends through the elongated screw hole 13 and the aperture (not shown) in the arm 1. When the bolt 14 is tightened, it causes the member 4 to pivot with the arm 1. When the bolt 14 is loosened, the member 4 may be moved independent of the arm 1, thus allowing for adjustment of the clearance between the tire rim 6 and the shoe 5. The support member 4 is pivotally adjusted when the is loosened. As a result, the support member 4 may be swung about the axis X relative to the brake arm 1. It is therefore possible to adjust the clearance between the shoe 5 and the tire rim 6 by movement of the support member 4 relative to the brake arm 1 about the axis X.

The present invention may be applied to any other types of caliper brakes such as a side-pull type caliper brake in addition to a cantilever type brake.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A bicycle brake apparatus comprising:

a brake arm pivotally mounted to a bicycle frame adjacent to a bicycle tire rim for providing selective engagement and disengagement of a brake shoe mounted on said arm against the rim by pivotal movement of the brake arm about a pivot axis on said frame;

a support member adjustably mounted to said brake arm via a first adjusting mechanism for positional changes with respect to said brake arm, said brake shoe adjustably mounted to said support member via a second adjusting mechanism for position changes relative to said support member, said support member confined to arcuate movement about said pivot axis relative to said brake arm.

2. A bicycle brake apparatus as set forth in claim 1 wherein said second adjusting mechanism includes a shoe position mounting surface mounted on said support member for providing angular adjustment of said shoe with respect to said tire rim independent of movement of said support member with respect to said brake arm.

3. The bicycle brake apparatus as set forth in claim 1, wherein said support member is pivotally mounted on said brake arm within an arcuate recess formed in said brake arm, said arcuate recess having a center that coincides with said axis.

4. The bicycle brake apparatus as set forth in claim 1, wherein said support member is pivotally mounted on said brake arm about said axis.

5. A bicycle brake mechanism component comprising:

a brake arm mounted to a bicycle frame for pivotal movement about a pivot axis defined on the bicycle frame adjacent to a bicycle tire rim;

a brake shoe support member coupled to said brake arm for arcuate movement about said pivot axis relative to movement of said brake arm;

a locking mechanism coupled to said brake arm and said brake shoe support member for selectively securing said brake shoe support member to said brake arm for movement therewith;

a brake shoe mounted to said brake shoe support member via a mounting mechanism for independently adjusting the position of said brake shoe with respect to said brake shoe support member.

6. A bicycle brake mechanism component as set forth in claim 5, wherein said mounting mechanism comprises:

said brake shoe support member being formed with two spherically shaped surfaces on opposite sides thereof with an aperture extending therethrough;

said brake shoe formed with a friction pad on a first side thereof, a mounting screw extending from a second side thereof, and a concave spherical recess formed concentrically with said mounting screw, said screw extending through said aperture; and a mounting washer having one surface provided with a convex spherically shaped surface, an aperture extending therethrough, said screw extending through said aperture such that said convex surface engages one of said spherically shaped surfaces.

7. A bicycle brake mechanism component as set forth in claim 5 further comprising:

said brake arm provided with an aperture formed proximate but spaced apart from said pivot axis;

said brake shoe support member being formed with an elongated arcuate screw hole;

said locking mechanism includes a bolt which extends through said aperture and said elongated arcuate screw hole.

8. A bicycle brake mechanism component as set forth in claim 5 further comprising;

said brake arm provided with an arcuate recess having a center which coincides with said pivot axis, and an aperture formed within said recess;

said brake shoe support member being formed with an arcuate portion which conforms to said arcuate recess and being disposed therein, said arcuate portion having an elongated arcuate screw hole formed therein, and a brake shoe mounting portion with said brake shoe mounting mechanism mounted to said brake shoe mounting portion; and said locking mechanism includes a bolt which extends through said aperture and said elongated screw hole.

9. A bicycle brake mechanism component comprising:

a brake arm mounted to a bicycle frame for pivotal movement about a pivot axis defined on the bicycle frame adjacent to a bicycle tire rim;

a brake shoe support member having a first portion disposed on said brake arm and a second portion perpendicular to said first portion;

a locking mechanism selectively engagable and dis-engagable with said brake arm and said brake shoe support member for securing said brake shoe support member to said brake arm, where said locking mechanism being engaged locks said brake shoe support member to said brake arm for pivotal movement about said pivot axis, and where said locking mechanism being dis-engaged from said brake arm, said brake shoe support member being constrained for arcuate movement about said pivot axis relative to said brake arm;

a brake shoe mounting mechanism mounted to said second portion of said brake shoe support member.

10. A bicycle brake mechanism component as set forth in claim 9, wherein said brake shoe mounting mechanism comprises:

said second portion of said brake shoe support member being formed with two spherically shaped surfaces on opposite sides thereof with an aperture extending therethrough;

said brake shoe formed with a friction pad on a first side thereof, a mounting screw extending from a second side thereof, and a concave spherical recess formed concentrically with said mounting screw, said screw extending through said aperture; and a mounting washer having one surface provided with a convex spherically shaped surface, an aperture extending therethrough, said screw extending through said aperture such that said convex surface engages one of said spherically shaped surfaces.

11. A bicycle brake mechanism component as set forth in claim 9 further comprising:

said brake arm provided with an aperture formed proximate but spaced apart from said pivot axis;

said first portion of said brake shoe support member being formed with an elongated arcuate screw hole;

said locking mechanism having a bolt which extends through said aperture and said elongated arcuate screw hole.

12. A bicycle brake mechanism component as set forth in claim 9 further comprising;

said brake arm provided with an arcuate recess having a center which coincides with said pivot axis, and an aperture formed within said recess;

said first portion of said brake shoe support member being formed with an arcuate shape which conforms to said arcuate recess and being disposed therein, said first portion having an elongated arcuate screw hole formed therein; and said locking mechanism includes a bolt which extends through said aperture and said elongated screw hole.

13. A bicycle brake apparatus comprising:

a brake arm pivotally mounted on a shaft on a bicycle frame, adjacent to a bicycle tire rim, said shaft defining an axis about which said brake arm pivots;

a support member adjustably coupled to said brake arm via an adjustment mechanism, said adjustment mechanism for selectively securing said support member to said brake arm;

a brake shoe mounted to said support member for engagement with said bicycle tire rim;

a movement restricting means confining movement of said support member to arcuate movement about said axis relative to said brake arm about said axis, thus maintaining an arcuate orientation of said brake shoe with respect to said bicycle tire rim.

14. A bicycle brake apparatus as set forth in claim 13 wherein said movement restricting means is an arcuate recess formed in said brake arm, said arcuate recess being formed with said axis as its arcuate center, and said support member conforming in shape to said arcuate recess to slide within said arcuate recess.

15. A bicycle brake apparatus as set forth in claim 13 wherein said movement restricting means is said shaft and said support member wherein said shaft extends through a portion of said support member thus confining said support member to arcuate movement about said shaft.

* * * * *